United States Patent [19]

Hofsäss et al.

[11] Patent Number: 5,306,990
[45] Date of Patent: Apr. 26, 1994

[54] ELECTRIC MOTOR CONTROL APPARATUS INCLUDING AN OUTPUT STAGE PROTECTED AGAINST MALFUNCTION AND DAMAGE

[75] Inventors: Michael Hofsäss, Vaihingen/Enz; Martin Rutz, Schwieberdingen; Harald Schweren, Korntal-Münchingen, all of Fed. Rep. of Germany

[73] Assignee: Robert Bosch GmbH, Stuttgart, Fed. Rep. of Germany

[21] Appl. No.: 963,394

[22] Filed: Oct. 19, 1992

[30] Foreign Application Priority Data

Oct. 18, 1991 [DE] Fed. Rep. of Germany ....... 4134495

[51] Int. Cl.⁵ ............................................. H02H 7/08
[52] U.S. Cl. ................................... 318/434; 361/33
[58] Field of Search ............... 318/434, 599, 811, 14; 361/23, 30, 31, 33, 78, 79, 88, 91; 363/50, 53, 56

[56] References Cited

U.S. PATENT DOCUMENTS

| | | | |
|---|---|---|---|
| 3,845,373 | 10/1974 | Totsu et al. | 318/434 |
| 4,462,069 | 7/1984 | Becky | 361/91 |
| 4,695,776 | 9/1987 | Dishner et al. | 318/14 |
| 4,803,592 | 2/1989 | Ashley | 361/79 |
| 4,894,598 | 1/1990 | Daggett | 318/599 |
| 4,951,188 | 8/1990 | Peter et al. | |
| 4,979,066 | 12/1990 | Kawata et al. | 361/79 |
| 5,021,726 | 6/1991 | Reinhardt et al. | 318/811 |
| 5,159,515 | 10/1992 | Fishbein | 361/86 X |
| 5,173,832 | 12/1992 | Giorgetta et al. | 361/88 |

Primary Examiner—Jonathan Wysocki
Attorney, Agent, or Firm—Walter Ottesen

[57] ABSTRACT

A control arrangement for electrical motors and motor vehicles includes measures which fulfill the requirements with respect to short circuits, protection against polarity reversal, load-dump protection, blocking against defective operation, reduced complexity, direct drivability from a computer unit, reduced disturbance spectrum and reduced inherent loss.

15 Claims, 3 Drawing Sheets

ELECTRIC MOTOR CONTROL APPARATUS INCLUDING AN OUTPUT STAGE PROTECTED AGAINST MALFUNCTION AND DAMAGE

BACKGROUND OF THE INVENTION

U.S. Pat. No. 4,951,188 discloses a control arrangement which controls an electric motor via at least one switching element with clocked drive signals. A switching arrangement is located between a computer unit generating the control signals and the electric motor. The circuit arrangement includes a first circuit unit in addition to the at least one switching element. The first circuit unit acts as a voltage increasing circuit for driving the at least one switching element. Here, a capacity is charged which leads to an increase in voltage at the drive input of the at least one switching element via the operating voltage of the circuit arrangement. The known circuit arrangement includes additional circuits such as current detecting elements, voltage controller circuits as well as a diagnostic circuit for monitoring current in the area of the motor or the switching elements.

However, in U.S. Pat. No. 4,951,188 no measures are described with respect to the following: preventing the control of the electric motor in the event of faults in the computer unit; providing protection against defective drives; providing measures which are suitable for protection against reversed polarity; or, protecting overloaded components or overloaded entire circuits during overvoltage conditions. In motor vehicles, electric motors are increasingly used as actuators even in safety-relevant control systems such as drive-slip control systems or electronic gas pedal systems. For this reason, high requirements as to operational safety, availability and complexity are imposed on the circuit arrangement controlling the electric motors in dependence upon the drive signals generated in a computer unit. These requirements relate especially to the following points: resistance to short circuits; protection against polarity reversals; load-dump protection (protection of circuits when a battery clamp is separated); latching against defective functions; reduced component complexity and low cost; direct drivability from a computer element; mid to high power capability at low inherent loss; and, reduced disturbance spectrum caused by radiation.

As described above, these requirements can at least in part not be fulfilled by known circuit arrangements.

SUMMARY OF THE INVENTION

It is an object of the invention to provide a control apparatus for electric motors in motor vehicles which fulfills these requirements with respect to operational safety, availability and complexity.

The procedure provided by the invention leads to a control apparatus for electric motors which fulfills the above-mentioned criteria.

A first circuit unit is advantageous with respect to reducing the complexity for such a circuit arrangement. With the aid of this circuit unit, an overvoltage is obtained by means of the charging of a capacitor (hidden charge pump). This makes possible also the advantageous direct drivability from a computer element without the necessity of providing circuit elements for forming a preferably pulse-shaped drive signal.

Supplements to the first circuit unit are especially advantageous in connection with a bridge drive (full bridge, half bridge) of the electric motor. These supplements lock the circuit arrangement against defective functions with reference to inverse bridge drives as well as with respect to computer element faults.

The described measures are also advantageous for limiting the flank steepness and therefore the disturbance radiation.

A further advantage results from the inquiry of the potentials at the motor terminals by the computer element with respect to short circuit protection.

A further advantage is provided by the reversal pole protection by means of which a reduced loss in power of the circuit arrangement is obtainable with the electrolyte capacitor for smoothing the vehicle voltage being relieved of load.

The protection provided by the invention in the case of a battery clamp becoming separated is with respect to complexity and operability especially advantageous.

BRIEF DESCRIPTION OF THE DRAWINGS

The invention will now be described with reference to the drawings wherein FIGS. 1 to 3 show measures provided by the invention and circuit units of the circuit arrangement.

DESCRIPTION OF THE PREFERRED EMBODIMENTS OF THE INVENTION

Figure 1:
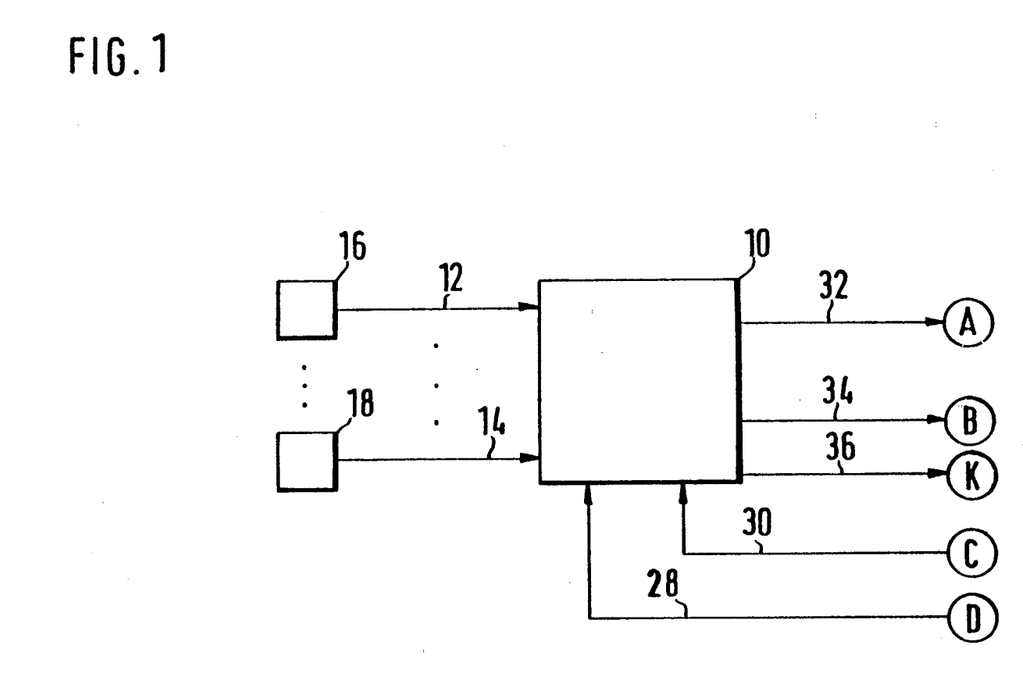
FIGS. 1 to 3 show a circuit arrangement in the context of an example for a control system for an electric motor with which a power-determining element of an internal combustion engine such as a throttle flap or an injection pump is connected.

The control system of the invention includes at least one computer element 10 to which operating variables of the motor vehicle and/or of the drive unit thereof are supplied via input lines 12 to 14 from corresponding measuring devices 16 to 18, respectively. In addition, the computer element 10 has further input lines 28 and 30 while the lines 32, 34 and 36 are output lines of the computer element 10. These lines are shown extended in FIGS. 2 and 3.

The computer element 10 generates drive signals in dependence upon the operating variables supplied via the input lines 12 and 14. The drive signals are for the circuit arrangement shown in FIGS. 2 and 3 and therefore for the electric motor. The drive signal is pulse shaped and has a clock ratio changing in dependence upon the supplied operating variables. In one embodiment, the provision is made that a low signal level results in a current flow through the motor, that is, a drive of the motor. A high signal level represents then an interruption of the current flow. In the case of a bridge circuit (full bridge or half bridge) for driving the motor, the drive signals for a first rotational direction of the motor are supplied via the line 32 and, for the other rotational direction, the drive signals are supplied via the line 34 from the computer element to the circuit arrangement 19.

Depending upon the configuration of the control system (drive-slip control, idle control with gasoline or diesel injection and/or ignition control, electronic gas pedal, road speed control) the operating variables of the engine or of the vehicle of concern can be the wheel speed of rotation, engine temperature, battery voltage, engine speed, accelerator pedal position, throttle flap setting, injection pump setting and/or road speed. These operating variables are made available to the computer element 10 from corresponding measuring devices 16 to 18. The computer element 10 forms the drive signals from the input signals in the particular embodiment in a manner known from the state of the art. These drive signals are for the particular direction of rotation of the electric motor for adjusting the desired power. The computer element 10 can switch off the drive via the output line 36 in the case of a fault. Potentials in the area of the engine clamps are supplied to the computer element via the input lines 28 and 30. These potentials are evaluated in the computer element 10 with respect to a fault condition in the area of the circuit arrangement.

Figure 2:
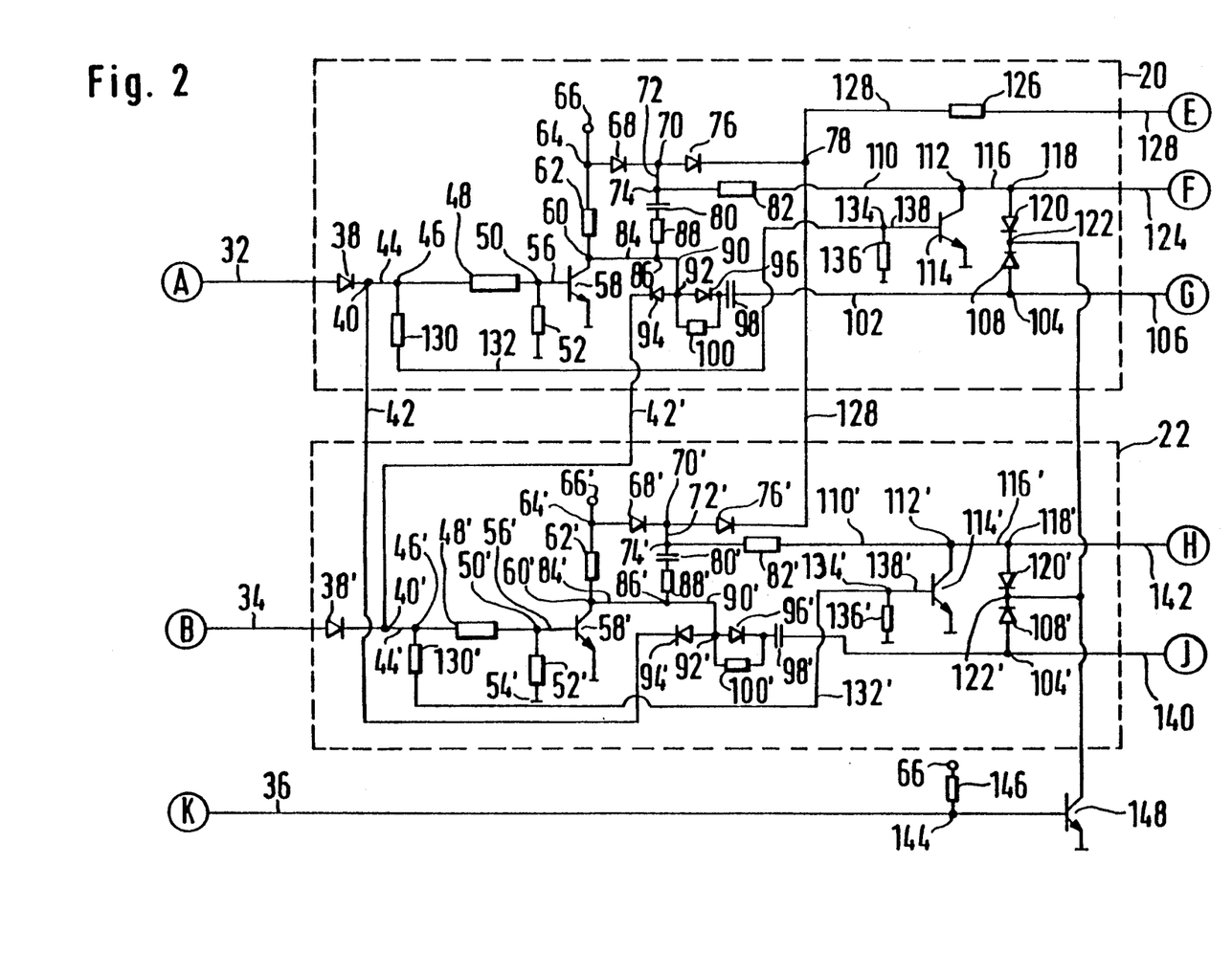
Figure 3:
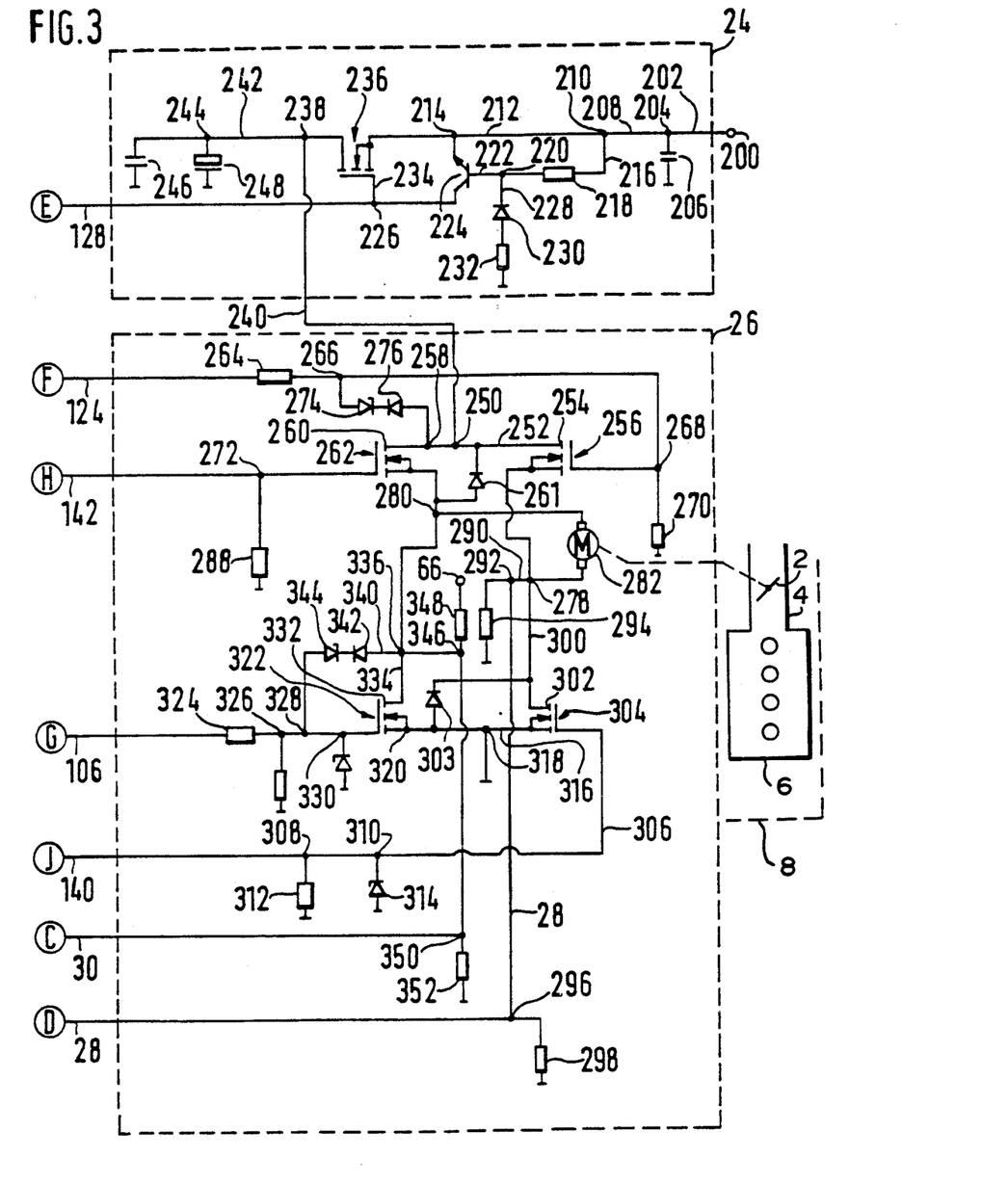

In FIGS. 2 and 3, a full-bridge circuit is shown as an embodiment of the circuit arrangement of the invention. This full-bridge circuit includes essentially a first circuit unit 20 for driving the electric motor in a first rotational direction as well as a circuit unit 22 for the other rotational direction. The circuit unit 22 is built up in a manner comparable to the first circuit unit. The two circuit units 20 and 22 include measures with respect to overvoltage, for locking against defective operations, for reducing the disturbance spectrum, etcetera. Furthermore, a second circuit unit 24 is shown with the aid of which the protection against reversal of polarity of the control unit is realized at reduced inherent losses and with little complexity. A third circuit unit 26 is shown as a third element which is the actual full-bridge circuit. This circuit includes means for detecting the potentials in the area of the motor clamps as well as measures for protecting the circuit in the event that the battery clamps become separated.

The circuit functions and units referred to above can be utilized in any desired combination for control systems.

The output line 32 of the computer element 10 is connected to the first circuit unit 20 as shown in FIG. 2 whereas the output line 34 is connected to the circuit unit 22 configured identically in the embodiment shown. To simplify the description, the components of the circuit unit 22 which are the same as those in circuit unit 20 are identified by the same reference numerals with a prime symbol and are not further explained. Arrangement, circuitry and function of the components will become apparent from the description of circuit unit 20 which follows.

The input line 32 is connected to the anode of a diode 38 having a cathode connected to the terminal 40. A line 42 leads from terminal 40 to the circuit unit 22 while a further line 44 leads from circuit node 40 to circuit node 46.

A resistor 48 is connected from circuit node 46 to circuit node 50 and circuit node 50 is connected to ground via a resistor 52. Circuit node 50 is also connected via a line 56 to the base of a transistor 58. The emitter terminal of transistor 58 is connected to ground while the collector terminal is connected to circuit node 60. A line leads from circuit node 60 via a resistor 62 to the circuit node 64 which, in turn, is connected to the positive pole 66 of the operating voltage and the anode of a diode 68. The cathode of the diode 68 is connected to a circuit node 70 from which a first line 72 is connected to the circuit node 74. Another line connects the circuit node 70 to the anode of the diode 76. The cathode of the diode 76 is connected to the circuit node 78. The circuit node 74 is connected to a capacitor 80 and to a resistor 82.

A line 84 leads from circuit node 60 to the circuit node 86. A resistor 88 is connected to circuit node 86 and connects this circuit node to capacitor 80. A line 90 leads from circuit node 86 to the circuit node 92. The anode of diode 94 is connected to circuit node 92 and a line 42', which comes from circuit unit 22, is connected to the cathode of diode 94. The circuit node 92 is also connected to the anode of diode 96 and the cathode thereof is connected to a capacitor 98. The diode 96 is connected in parallel to a resistor 100.

A line 102 leads from capacitor 98 to the circuit node 104. The line 106 is also connected to circuit node 104 and is an output line of circuit unit 20. The anode of diode 108 is also connected to the circuit node 104.

A line 110 leads from resistor 82 to circuit node 112 to which the collector of a transistor 114 is also connected. A further line 116 leads from circuit node 112 to the circuit node 118 to which the anode of a Zener diode 120 is connected. The cathodes of the diodes 108 and 120 are connected together at circuit node 122. The output line 124 of circuit unit 20 leads from circuit node 118 to circuit unit 26.

An input line 128 of the circuit unit 20 is connected via a resistor 126 to circuit node 78. The input line 128 connects circuit unit 20 to the circuit unit 24 (FIG. 3). The line 128 runs from circuit node 78 to circuit unit 22. The line 128 also defines the input line of circuit unit 22.

A line 132 runs from the circuit node 46 via a resistor 130 to the circuit node 134 at which a resistor 136 is connected to ground. A line 138 runs from circuit node 134 to the base of transistor 114 having an emitter connected to ground and a collector connected to the circuit node 112.

The output lines 106 and 124 of the circuit unit 20 correspond to the output lines 140 and 142 of the circuit unit 22.

The output line 36 of the computer element 10 is shown in FIG. 2 and leads to a circuit node 144 to which a resistor 146 is connected opposite to the positive pole 66 of the supply voltage. The line 36 leads from circuit node 144 to the base of transistor 148 having an emitter connected to ground and a collector connected to the circuit node 122 of circuit unit 20 and circuit node 122' of circuit unit 22.

The circuit unit 24 for realizing protection against a reversal of polarity is shown in FIG. 3. A line 202 leads from circuit node 200 of the battery voltage (vehicle electrical system) to the circuit node 204 on which a capacitor 206 is connected to ground. A line 208 leads from circuit node 204 to circuit node 210 on which a line 212 leads to circuit node 214 while another line 216 leads via the resistor 218 to circuit node 220. A line 222 leads from circuit node 220 to the base of a transistor 224 having an emitter connected to circuit node 214 and having a collector connected to a circuit node 226. In addition, a line 228 leads from circuit node 220 to the cathode of the diode 230. The anode of diode 230 is connected via resistor 232 to ground. The output line 128 of the circuit unit 20 is connected to circuit node 226 while, on the other end, a line 234 leads to the gate of switching transistor 236. The source terminal and drain terminal of the switching transistor 236 are connected to circuit node 214 and a circuit node 238, respectively. A line 240 leads from circuit node 238 to the circuit unit 26 and another line 242 leads from circuit node 238 to a circuit node 244 on which a first capacitor 246 and an electrolyte capacitor 248 are connected to ground. The electrolyte capacitor 248 is connected with its positive pole to the circuit node 244.

The line 240 leads into the circuit unit 26 to a circuit node 250. A line 252 runs from circuit node 250 to the drain terminal 254 of the switching transistor 256 while a second line 258 runs to the drain connection 260 of switching transistor 262. The line 124 is one of the output lines of the circuit unit 20 and leads via a resistor 264, a circuit node 266 and the circuit node 268 to the gate terminal of transistor 256. A resistor 270 is connected from circuit node 268 to ground. The line 142 is the output line of the circuit unit 22 and leads via the circuit node 272 to the gate terminal of transistor 262.

A line extends from circuit node 266 via two diodes 274 and 276 to circuit node 258. Diodes 274 and 276 are connected together at their cathodes and diode 274 is a Zener diode. The source terminal of the switching transistor 256 leads to the circuit node 278 while the source terminal of the switching transistor 262 leads to the circuit node 280. If the transistor 262 is omitted in the context of an embodiment for a half-bridge drive circuit, then a diode 261 is inserted in lieu thereof. The cathode of this diode 261 is connected to the circuit node 250 while the anode thereof is connected to circuit node 280.

The electric motor is connected between connecting nodes 278 and 280.

A resistor 288 is connected from circuit node 272 to ground. A line 290 leads from circuit node 278 to circuit node 292 whereat a resistor 294 is connected to ground. In addition, the line 28 leads from circuit node 292 via the circuit node 296 to computer element 10. A resistor 298 is connected from circuit node 296 to ground. In addition, a line 300 leads from circuit node 278 to the drain terminal 302 of switching transistor 304. The gate of switching transistor 304 is connected via a line 306 to circuit node 310 at which a Zener diode 314 is connected to ground. The line 306 leads from circuit node 310 to circuit node 308 where a resistor 312 is connected to ground. The line 306 leads from circuit node 308 to line 140 which is the output line of the circuit unit 22.

In the same manner as above, and in the event of a half bridge, a diode 303 is inserted in lieu of transistor 304. The cathode of diode 303 is connected to line 300 and the anode of this diode is connected to circuit node 318. If the counter diagonal is selected as a half bridge, then the procedure should be followed as with respect to transistors 256 and 322 above.

The source terminal of switching transistor 304 is connected via line 316 to circuit node 318 which is connected to ground and is also connected to source terminal 320 of a fourth switching transistor 322. The gate of transistor 322 is connected via the circuit nodes 326, 328 and 330 as well as via a resistor 324 to the line 106 which is the output line of circuit unit 20. A resistor leads from circuit node 326 to ground and a Zener diode leads from circuit node 330 to ground. The drain terminal 332 of the switching transistor 322 is connected via connecting line 334 and circuit node 336 to circuit node 280. A line 340 leads from circuit node 336 via two diodes 342 and 344 to the circuit node 328. The cathodes of the diodes 342 and 344 are connected to each other and the diode 344 is a Zener diode. The line 30 leads back to the computer element 10 and is connected to circuit node 336 via circuit nodes 350 and 346. A resistor 348 leads from circuit node 346 to the positive pole 66 of the supply voltage and a resistor 352 is connected from circuit node 350 to ground.

The switching transistors 256, 262, 304 and 322 conjointly define a full-bridge circuit for driving the electric motor 282. The motor 282 rotates in the first direction when the switches 256 and 322 are closed and rotates in the other rotational direction when switches 262 and 304 are closed. The potentials of the motor terminals are detected by resistors 294 and 348 and conducted to the computer element via the lines 28 and 30 for fault evaluation.

The electric motor 282 can, for example, drive the throttle flap 2 arranged in the intake pipe 4 of an internal combustion engine 6. The internal combustion engine 6 is part of a motor vehicle schematically represented by broken line 8.

The operation of the circuit arrangement shown in FIGS. 1 to 3 is explained below.

As mentioned above, in the embodiment shown, the phase of the non-drive (that is, the current flow through the motor 282 is interrupted) is characterized by a positive signal level on the lines 32 and 34 whereas the driving phase (that is, the current is supplied to the motor 282) is characterized by a low signal level at close to ground potential.

The switching units 20 and 22 are connected to the circuit unit 24 and to the battery terminal (terminal of the vehicle electrical system) of the drive system via input line 128. The positive pole 66 defines the operating voltage of the control system.

First, the circuit measures are described which ensure the drivability of the switching transistors 256, 262, 304 and 322 and which contribute a large part to the reduction of the complexity with reference to the number of components and cost.

The computer element controls the electric motor in a first rotational direction essentially via line 32, diode 38, resistor 48, transistor 58, diode 96, line 106, resistor 324 and switching transistor 322 as well as via the line 32, diode 38, resistor 48, transistor 58, resistor 88, capacitor 80, resistor 82, line 124, resistor 264 and switching transistor 256. The same applies for the other rotational direction of the motor which is determined by the switching transistors 262 and 304.

In the switched-off state, that is, at high signal level on the line 32 (the same applies for the line 34 of the circuit unit 32), the transistors 58 and 114 are in the closed state. The potential at the circuit node 60 is therefore in the region of ground potential and the capacitor 80 is charged via the resistor 88 and the diode 68 to the value of the operating voltage 66 (operating voltage, for example, 10 to 12 Volts). A low signal level is present on the lines 84, 90, 102 with the discharged capacitor 98 (as described below) because of the closed transistor 58 and the circuit node 60 lying in the region of ground potential. For this reason, a low signal level is present also on the output line 106 of the circuit unit 20 (output line 140 of circuit unit 22) and the switching element 322 (304) of the circuit unit 26 is not actuated, that is, not closed.

Because of the transistor 114 which is likewise closed, the circuit node 112 and therewith the output line 124 are also in the area of ground potential. In this way, a low signal level results on the output line 124 of the circuit unit 20 (on the output line 142 of circuit unit 22) so that the switching element 256 (262) for driving the electric motor is not actuated, that is, not closed.

All switching elements of the circuit unit 26 are not actuated in this operating state. For this reason, the current flow through the motor 282 via the line 240 through the motor to ground point 318 is interrupted and the system is therefore in the non-drive state.

In the drive state, the transistors 58 and 114 are blocked, that is, when the potential on line 32 (34)

changes to near ground potential for a pregiven time duration at a specific pulse duty factor. In this way, the potential at the circuit node 60 reaches operating potential (10 to 12 Volts) whereby the circuit node 74 and therefore the circuit node 112 for a likewise open transistor 114 are raised to a potential, which corresponds approximately to twice operating potential (approximately 20 Volts), as a consequence of the energy (capacitor voltage at the level of operating voltage) stored in the capacitor 80. In this way, the output line 124 of the circuit unit 20 (the same is true on output line 142 of circuit unit 22}is at a high signal level which leads to the closing of power transistor 256 (262), that is, to its actuation.

Capacitor 98 is discharged in the non-drive state. A high signal level is present on the output line 106 of the circuit unit 20 (the same applies to output line 140 of circuit unit 22 when driving in the other rotational direction) at the beginning of the drive phase after transistor 58 is opened by the high potential at the circuit node 60. This high signal level leads to the actuation (closure) of the power transistor 322 (304).

In this way, current flows through electric motor 282 and this motor rotates in dependence upon the current direction in the one direction (transistors 256 and 322 actuated) or in the other direction (transistors 262 and 304 actuated). The system then is in the drive state.

The capacitor 80 is discharged via resistor 270 after a change of the signal level on the line 32 (34). At the same time, the capacitor 98 is charged via the resistor 226. These changes in the charge state are small in comparison to the time duration of the low active signal level so that the actuation of the switching transistors of circuit unit 26 is ensured for this duration.

The measures described above permit the direct drive of the switching transistors from the computer element 10 and permit a low number of components. In this way, the space requirement as well as cost are reduced. In addition, the circuit described can be used universally for various drive stages such as full bridges, half bridges or individual drives and can be adapted to various electrical consumers.

In addition, advantageous measures for preventing and blocking defective operations of the circuit arrangement and/or of the computer element 10 and their effects are provided.

The charge state changes of the capacitors 80 and 98 in the drive state lead to the situation that the voltage on the gates of the switching transistors is reduced in a defined manner. If, as a consequence of a fault in the computer element 10, no correct signal level change is carried out any more, the drive of the switching transistor remains too long and the discharge and charging operations of the capacitors 80 and 98 are carried out until the signal levels on the output lines 124 (142) and 106 (140) of the circuit unit 20 (22) show a voltage value, which is less than the voltage thresholds of the switching transistors, then these transistors are opened and the current flow through the motor is interrupted. In this way, the circuit arrangement itself switches off, a defective continuous drive of the motor is avoided and the motor is reliably transferred into the switched-off state.

Measures of this kind are necessary when applied to electronic gas pedals or for drive-slip controls because a continuous drive of the motor in the first case can mean an acceleration of the motor vehicle and, in the other case, an erroneous loss in power can result.

In addition, in the case of a fault, no simultaneous actuation of the motor in both rotational directions may occur. This would cause the battery voltage to become short circuited. For this reason, measures are provided by the invention by means of which the two drive branches mutually block each other and a simultaneous actuation is avoided.

The capacitor 98 is fully discharged in the non-drive state. The diode 94 (94') is in blocking operation because of the high signal level present on the line 42 (42') for non-drive in the second rotational direction. In the drive state, that is, for a low signal level on lines 32 or 34, this diode no longer permits a signal level increase at circuit node 92 (92') and at circuit node 86 (86') since the diode would then be switched into the conducting state and prevent a drive of the switching elements.

The diode 94 (94') blocks the possible drive in the second rotational direction during the drive phase in the first rotational direction. A defective drive via line 34 (32) and the circuit unit 22 (20) is effectively blocked.

For detecting fault states in the circuit arrangement, especially short circuits and similar electrical faults, the potentials on the motor terminals are detected via the resistors 294 and 348 and conducted to the computer element via lines 28 and 30. There, fault states are picked up with the aid of the potential values with reference to the instantaneous drive situation.

In the case of a fault and after the motor is switched off, the computer element can perforce prevent the drive via a corresponding voltage signal by closure of transistor 148 and switch off the circuit arrangement.

The switch-on time constants and the switch-off time constants of the capacitor charging operations are determined by the diode 96 and the resistor 100. In this way, different flank slope steepness of the pulse-shaped drive signal can be adjusted and the emitted disturbing radiation can be minimized.

The so-called load-dump protection is of special significance in connection with the circuit arrangement 26. The load-dump protection protects the circuit when the battery connection becomes separated. If a connection of the battery falls off, then the generator of the motor generates a very high voltage which damages the electronic components and especially also the power transistors and possibly leads to their destruction.

If a fault of this kind occurs, then the transistor 256 is switched on because of the high voltage at circuit node 250 via the Zener diode 274 and the diode 276; that is, driven in the sense of an actuation. In this way, high signal levels are present at the circuit node 254 as well as on the gate of the transistor. The transistor 256 then operates as a Zener diode and can receive a voltage of approximately 40 Volts across its drain-source path and stabilize the same. The diode 342 and the Zener diode 344 in combination with the transistor 322 show similar effects. This transistor too can receive a voltage of approximately 40 Volts and the difference to the actual voltage present is taken up by the motor 282. In this way, the overvoltage pulse, which occurs when the battery terminal is separated, is distributed to two transistors as well as the motor. In this way, it is possible to take up considerable overvoltages in the region of 120 Volts without damaging the circuit.

In this way, a load-dump protection can be realized for a bridge output stage with practically no take up of energy. The circuit adapts to the voltage occurring for this fault condition. If the voltage in the load-dump case increases above 80 Volts (the sum of the voltages which can be stabilized by the transistors), then a current flow through the transistors occurs which generates a power loss. The point of use for this take up of current can be adapted by modifying the Zener voltage of the transistors.

The circuit arrangement 24 provides a protection against the reversal of polarity and leads to an advantageous reduction of power loss as well as protects the electrolyte capacitor 248 which smooths the vehicle voltage supply.

The protection against reversal of polarity is essentially provided by the transistor 236. If the motor should take on current, then the transistor 236 is switched on via the diodes 68 and 76 as well as via the resistor 126. At this time point, the transistor is driven inversely. In this way, the parasitic diode (source-drain) of the transistor is very substantially relieved of load since the current flows via the drain-source path. Only a significantly reduced loss in power occurs. For non-drive of the motor, a current flows via the transistor 236, which is then operating in normal operation, back into the vehicle electrical system. In the case of a half bridge, the current loop is closed by the diodes 261 and 303 and in the case of a full bridge, the current loop is closed through the parasitic source-drain diodes of the diagonally opposite transistors. In this way, the energy stored in the coil field of the motor is returned up to 35% back to the supplying vehicle electrical system. If the battery voltage is connected with polarity reversed at circuit node 200, then the drive of the transistor 236 is switched off via the resistor 218, the diode 230 as well as the transistor 224. In this way, the bridge is protected against destruction by short circuit of the supply loop by means of the transistor 224.

The electrolyte capacitor 248 is driven in the vehicle electrical system and is, as a rule, very intensely charged. This capacitor has the task of smoothing the vehicle electrical supply system waves generated by the control system and would, without decoupling from the vehicle electrical supply system, also smooth the vehicle electrical supply system outside of the operation of the control system and therefore generate unnecessary power losses. For this reason, the service life of this component is reduced. For output stages, which are not continuously in operation, it is desirable to protect the electrolyte capacitor. Therefore, the transistor 236 is switched off when not driven and the capacitor 248 is decoupled from the vehicle electrical system. Accordingly, this leads to no unnecessary smoothing of the vehicle electrical system and therefore the power loss in the electrolyte capacitor can be effectively reduced and the service life of the capacitor is increased.

The measures according to the invention described above can be applied in other embodiments alone or in any desired combination.

The application of the measures provided by the invention are advantageous in combination with other electrical motors in motor vehicles.

It is understood that the foregoing description is that of the preferred embodiments of the invention and that various changes and modifications may be made thereto without departing from the spirit and scope of the invention as defined in the appended claims.

What is claimed is:

1. A control apparatus for an electrical motor for a motor vehicle, the control apparatus comprising:
   at least one computer unit for generating the control signals for actuating the motor;
   voltage supply means having positive and negative pole connecting terminals;
   a circuit arrangement connected between said computer unit and said motor and including:
   first circuit means for conducting current to said motor for driving said motor to rotate in first and second directions of rotation;
   said first circuit means including a first power switch connected between said positive pole connecting terminal and said electric motor and a second power switch connected between said electric motor and said negative pole connecting terminal;
   second circuit means for conducting said control signals to said power switches;
   third circuit means for supplying a supply voltage from said voltage supply means to said first circuit means;
   protective means for protecting said control apparatus against malfunction and damage; and,
   said protective means including switching means for driving said first and second power switches independently of said control signals when an overvoltage occurs at one of said connecting terminals thereby permitting a current flow through said two power transistors and said electric motor.

2. The control apparatus of claim 1 further comprising a bridge circuit connected between said circuit arrangement and said motor; said bridge circuit including at least two bridge branches; and, blocking means for blocking the drive of said motor via a first one of said branches when said motor is driven via a second one of said branches.

3. The control apparatus of claim 1, one of said switches including: a control terminal and a voltage supply terminal; and, said terminals being connected to each other so that the other power switch is driven in the event of an overvoltage in said voltage supply means.

4. The control apparatus of claim 1, one of said power switches being for protecting against a polarity reversal; the other one of said power switches having a circuit so as to be closed both when said motor is driven and when said motor is not driven and for conducting the supply current to and from said motor; and, said other power switch being adapted to open the supply line to said motor in the event of a polarity reversal.

5. The control apparatus of claim 1, said circuit arrangement including a bridge circuit having at least two switching elements which actuate the motor in respective rotational directions; and, circuit means for blocking a rotation of said motor in one direction while said motor rotates in the other direction.

6. The control apparatus of claim 1, said computer unit having at least one output which is connected to one of said power switches, said one power switch being adapted to assume a switching state in the non-drive case by means of which a capacitor becomes charged and, said one power switch being adapted to assume a switching state in the drive case by means of which the capacitor becomes discharged so that the drive is interrupted.

7. The control apparatus of claim 1, said circuit arrangement being a full bridge circuit having four switching elements, which, in respective pairs, drive the motor in two rotational directions.

8. The control apparatus of claim 7, one pair of said switching elements for one rotational direction being actuated in dependence upon a drive signal with said drive signal driving at least two transistors, said first switching element assuming a switching state in the non-drive case by means of which a capacitor is charged, the second switching element connecting the drive line to the signal level of the non-drive, in the drive case, the first switching element assuming a switching state by means of which the capacitor is discharged and the second switching element releases the drive.

9. The control apparatus of claim 1, further comprising circuit means for making different adjustments of the charging time constants of the pulse-shaped drive signal.

10. The control apparatus of claim 1, wherein the motor vehicle has an internal combustion engine and said circuit arrangement controlling a power-determining element of said engine.

11. The control apparatus of claim 1, wherein said motor vehicle has a vehicle electrical system and an electrolyte capacitor for smoothing the voltage supplied by said system and wherein said first switching transistor has a drain terminal and said electrolyte capacitor is connected to said drain terminal.

12. The control apparatus of claim 1, said protective means further comprising:
a first switching transistor having a drain-source path connected into said third circuit means so as to cause said path to define a segment of the circuit path supplying said supply voltage to said first circuit means;
a second switching transistor likewise forming part of said third circuit means and connected to said positive pole connecting terminal;
said first switching transistor having a gate electrode connected via said second switching transistor to said positive pole connecting terminal; and,
said second switching transistor being connected to said second circuit means for receiving a control signal for switching on said second switching transistor thereby, in turn, switching on said first switching transistor to control the voltage supply to said first circuit means.

13. A control apparatus for an electrical motor for a motor vehicle, the control apparatus comprising:
at least one computer unit for generating the control signals for actuating the motor;
voltage supply means having positive and negative pole connecting terminals;
a circuit arrangement connected between said computer unit and said motor and including:
first circuit means for conducting current to said motor for driving said motor to rotate in first and second directions of rotation;
said first circuit means including a first power switch connected between said positive pole connecting terminal and said electric motor and a second power switch connected between said electric motor and said negative pole connecting terminal;
second circuit means for conducting said control signals to said power switches;
third circuit means for supplying a supply voltage from said voltage supply means to said first circuit means;
protective means for protecting said control apparatus against malfunction and damage; and,
said protective means including a first switching transistor having a drain-source path connected into said third circuit means so as to cause said path to define a segment of the circuit path supplying said supply voltage to said first circuit means; a second switching transistor likewise forming part of said third circuit means and connected to said positive pole connecting terminal; said first switching transistor having a gate electrode connected via said second switching transistor to said positive pole connecting terminal; and, said second switching transistor being connected to said second circuit means for receiving a control signal for switching on said second switching transistor thereby, in turn, switching on said first switching transistor to control the voltage supply to said first circuit means.

14. The control apparatus of claim 13, said protective means further comprising: switching means for driving said first and second power switches independently of said control signals when an overvoltage occurs at one of said connecting terminals thereby permitting a current flow through said two power transistors and said electric motor.

15. A control apparatus for an electrical motor for a motor vehicle, the control apparatus comprising:
at least one computer unit for generating the control signals for actuating the motor;
voltage supply means having positive and negative pole connecting terminals;
a circuit arrangement connected between said computer unit and said motor and including:
first circuit means for conducting current to said motor for driving said motor to rotate in first and second mutually opposite directions of rotation;
said first circuit means including first, second, third and fourth power switches conjointly defining a bridge circuit having a diagonal into which said electric motor is connected;
said first and second power switches conjointly defining one end terminal of said diagonal and said third and fourth power switches conjointly defining the other end terminal of said diagonal and said electric motor being connected between said end terminals;
second circuit means having a first circuit for conducting a first one of said control signals to said first and third power switches for causing said electric motor to rotate in said first direction and having a second circuit for conducting a second one of said control signals to said second and fourth power switches for causing said electric motor to rotate in said second direction opposite said first direction;
third circuit means for supplying a supply voltage from said voltage supply means to said first circuit means;
said first circuit including a first capacitor corresponding to said first power switch and a second capacitor corresponding to said third power switch with one of said first and second capacitors being charged and the other one of said first and second capacitors being discharged when said first and third power switches are actuated by said first control signal; and, means for switching off said first and third power switches after a predetermined time span during which said first and third power switches are conductive;
said second circuit including a first capacitor corresponding to said second power switch and a second capacitor corresponding to said fourth power switch with one of said first and second capacitors of said second circuit being charged and the other one of said first and second capacitors of said second circuit being discharged when said second and fourth power switches are actuated by said second control signal; and, means for switching off said second and fourth power switches after a predetermined time span during which said second and fourth power switches are conductive; and, blocking means for blocking the actuation of said second and fourth power switches when said first and third power switches are actuated and for blocking the actuation of said first and third power switches when said second and fourth power switches are actuated.

* * * * *